United States Patent
Keller et al.

(10) Patent No.: US 8,217,087 B1
(45) Date of Patent: Jul. 10, 2012

(54) AEROGEL WITH REDUCED DUST, STATIC CHARGE, AND HAVING REDUCED FLUIDITY WHEN IN GRANULAR FORM

(75) Inventors: Robert R. Keller, Bedford, NH (US); Walter L. Magee, Jr., Manitou Beach, MI (US); William D. Varnell, Concord, NH (US); John W. McKenna, Manchester, NH (US); George N. Ghattas, Manchester, NH (US); Jonathan A. Beaupre, Weare, NH (US); Janet D. Virr, Derry, NH (US)

(73) Assignee: Keller Companies, Inc., Manchester, NH (US)

( * ) Notice: Subject to any disclaimer, the term of this patent is extended or adjusted under 35 U.S.C. 154(b) by 0 days.

(21) Appl. No.: 13/372,788

(22) Filed: Feb. 14, 2012

Related U.S. Application Data

(60) Provisional application No. 61/479,127, filed on Apr. 26, 2011.

(51) Int. Cl.
*C09K 3/00* (2006.01)
*C08J 3/00* (2006.01)

(52) U.S. Cl. ....................................................... 516/104
(58) Field of Classification Search .................. 516/104
See application file for complete search history.

(56) References Cited

U.S. PATENT DOCUMENTS

| | | | | |
|---|---|---|---|---|
| 3,751,276 | A | * | 8/1973 | Beyer et al. ................. 106/38.3 |
| 4,193,412 | A | * | 3/1980 | Heim et al. .................... 131/342 |
| 5,496,527 | A | | 3/1996 | Yokogawa et al. |
| 5,830,387 | A | | 11/1998 | Yokogawa et al. |

* cited by examiner

*Primary Examiner* — David W Wu
*Assistant Examiner* — Chun-Cheng Wang
(74) *Attorney, Agent, or Firm* — Davis & Bujold, P.L.L.C.

(57) ABSTRACT

An improved aerogel and a process for production of the same. The improved aerogel which has a significantly reduced dust (e.g., aerogel fines) and static charge, as compared with conventional aerogel products. The aerogel also has a "sticky" or "tacky" nature which can be used to attract any available dust, fines and/or particulate matter and also restrict flowability of aerogel granules, for example, out of a breached container and thereby minimize loss of the aerogel product through any breached opening.

23 Claims, 2 Drawing Sheets

FIGURE 1

Formation of aerogel clusters by mixing negatively and positively charged aerogel granules.

Negatively Charged
Aerogel Granules

Mixture of
Negatively and Positively
Charged Aerogel Granules

Positively Charged
Aerogel Granules

VIAL A: Unmodified, negatively charged aerogel granules from example 8.

VIAL B: 50/50 mixture of unmodified, negatively charged aerogel granules and CMA modified positively charged aerogel granules from example 8.

VIAL C: CMA modified positively charged aerogel granules from example 8.

AEROGEL WITH REDUCED DUST, STATIC CHARGE, AND HAVING REDUCED FLUIDITY WHEN IN GRANULAR FORM

FIELD OF THE INVENTION

The present invention relates to production of improved aerogels. The improved aerogels, both hydrophobic and hydrophilic aerogels, having significantly reduced dust (e.g., aerogel fines) as well as a significantly reduced static charge, as compared with typical aerogel products produced from silicon, zirconium, alumina, magnesium, or titanium based formulations. Aerogel, produced by the present invention, can form agglomerate structures that can have a "sticky" or "tacky" nature. That is, the aerogel particles either have a negative charge or a positive charge which attract oppositely charged aerogel particles and thereby form clumps that tend to restrict the "flowability" of aerogel, e.g., minimize the flow of the improved aerogel out of a breached container and/or movement of the aerogel granules within a container. The invention herewithin also allows for a significant reduction in dust generation when handling aerogels.

BACKGROUND OF THE INVENTION

The formation of aerogels, in general, involves two major steps; the first is the formation of a sol-gel like material, and the second is drying of the sol-gel like material to form the aerogel. In the past, the sol-gel like materials were made by an aqueous condensation of sodium silicate or a similar material. While this process works relatively well, the reaction forms salts, within the gel, that need to be removed by an expensive ion exchange technology and repetitive washing. This common technique thereby renders this production process time consuming, expensive and laborious.

With the recent development of sol-gel chemistry over the last few decades, a vast majority of silica aerogels prepared today utilize silicon alkoxide precursors. The most common silicon alkoxide precursors are tetramethyl orthosilicate (tetramethoxysilane (TMOS) $Si(OCH_3)_4$) and tetraethyl orthosilicate (tetraethoxysilane (TEOS) $Si(OCH_2CH_3)_4$). Less common aerogels can be produced from other metal alkoxides, such as tertapropoxyzirconium. However, many other alkoxides, containing various organic functional groups, can be used to impart different properties to the gel. An alkoxide-based sol-gel chemistry generally avoids the formation of undesirable salt byproducts and allows a much greater degree of control over the final product. The balanced chemical equation, for the formation of a silica gel from TEOS by a conventional method, is:

$$Si(OCH_2CH_3)_4(l) + 2H_2O(l) SiO_2(s) + 4HOCH_2CH_3(l)$$

For many applications of aerogels, the areogels are used in a granular form. Since aerogels provide superior insulation capabilities, compared to a variety of other materials, the aerogel granules are commonly used to fill cavities, containers, bags, panels, vessels, etc. (all of which are hereinafter collectively referred to as a "panel, container or structure"), for a variety of insulating applications. A key advantage for silica based aerogels is that they can be produced with a very low index of refraction while still having a high light transmission through the particles. The combination of the high light transmission and excellent insulation values of the silica based aerogels make them particularly suited for the needs of the fenestration industry.

For some applications, hydrophobing agents are added to the sol-gel formulation, or the sol-gel is soaked in a solution composing an organic solvent and hydrophobing agent. The hydrophobing agent then chemically attaches to both the interior and the external surfaces of the gel particles. Once these hydrophobing agent modified aerogels are dried, the aerogel then becomes hydrophobic. Known processes for producing hydrophobic aerogels are described, for example, in U.S. Pat. Nos. 5,496,527 and 5,830,387.

Unfortunately, low density silica based granular aerogels tend to be very delicate and friable. The handling procedure for such aerogels, typically required to fill a panel, container or structure with the aerogel particles, often results in some breakage or fracturing of the aerogel particles. Such breakage and/or fracturing of the aerogels, in turn, results in the development of aerogel fines or dust in the end product. These fines, if allowed to freely build up within the filled panel, container or structure, can result in a significant end product defect. The dust and/or fines can eventually settle or stratify thereby creating undesirable degradation of the aerogel properties, such as local differences in light transmission, air gaps, loss of insulation, and a cosmetically unappealing end product appearance. The dust also tends to be difficult to remove from a surface in the event that the aerogel product either spills or leaks out of the filled panel, container or structure.

It is also to be appreciated that as the aerogel flows into a panel, container or structure, a significant amount of static charge can be generated. This charge tends to impede the desired close, tight and uniform packing of the aerogel within the panel(s), container(s) or structure(s) and can cause aerogel particles to collect or build-up on surfaces, clothing and/or skin of the packaging personnel. Moreover, it is to be appreciated that high levels of static also can create a serious risk of either a fire or an explosion. Special aerogel filling procedures, such as those described in U.S. Pat. No. 7,621,299 which involve vibration, static charge dissipation and tapping, are often utilized in an attempt to facilitate tight, close packing of the panel, container or structure, with the aerogel granules. Notwithstanding such special aerogel filling procedures, further settling of the filled aerogel granules, during subsequent product handling, shipping and/or installation of the panel, container or structure, often occurs.

It is to be appreciated that tapping and/or vibration procedures, following the aerogel filling procedure, can result in a breakdown of the delicate granules and/or generate additional dust or fines within the aerogel end product. As noted above, the creation of dust and/or fines within the end product is generally to be avoided.

Moreover, once the panel, container or structure, filled with the aerogel, is then installed, there is often a need or desire to create one or more apertures, openings or holes through the panel, container or structure, in order to install associated plumbing, electrical wiring or the like. It has often been observed that once an aperture(s), opening(s) or hole(s) is formed within the panel, container or structure, containing the filled aerogel granules, the filled aerogel granules tend to readily and quickly pour or flow out through the aperture(s), opening(s) or hole(s) substantially immediately upon formation of the same. This, in turn, leads to aerogel spillage, from the panel, container or structure, which is often times difficult to clean. Further, refilling the breached panel, container or structure back to its initial completely full state, particularly with the statically charged aerogel granules, can be difficult to accomplish.

SUMMARY OF THE INVENTION

Wherefore, it is an object of the present invention to overcome the above mentioned shortcomings and drawbacks associated with the prior art.

An object of the present invention is to form an aerogel product that addresses the above noted and described problems relating to aerogel in general as well as aerogel handling and utilization. More specifically, the formation of an improved aerogel product that has a greatly reduced static charge (i.e., a mixture of aerogel granules having a generally "neutral" charge), minimizes the creation or formation of dust, and forms clumps or agglomerates of aerogel particles due to attraction of the positively and the negatively charged granules to one another. The formation of agglomerates or clumps of aerogel particles greatly reduces the fluidity or flowability of aerogel granules once they are installed within a panel, container or structure.

The present invention is directed to an improved granulated aerogel product which has a significantly reduced static charge, has a reduced flow or granular fluidity characteristics and generally contains less dust and/or other small particulate matter and/or fines. This is achieved by creating and subsequently combining aerogel granules of opposite electrical charges and thereafter permitting these oppositely charged granules to attract one other, e.g., become "sticky" or "tacky", and thereby form agglomerates or clumps of aerogel particles which resist flow of the aerogel. Furthermore, any associated aerogel dust and/or fines are also attracted to the larger agglomerates or clumps of aerogel particles and typically result in generally neutral charged larger masses or clumps of granulated. Although silicon, zirconium, titanium, aluminum, and magnesium based aerogels generally have a negative electrical static charge associated with them, the addition of or reaction of a "charge modifying additive" (CMA) with the sol-gel formulation or with a soaking solution, prior to drying the gel, can alter the charge of the produced aerogel to be electrically positive, as can be measured using a static meter or a similar device. Suitable charge modifying additives include reactive compounds such as, for example, N-Trimethoxisilylpropyl-N,N,N-Trimethyl Ammonium Chloride, Octadecyldimethyl (3-Trimethoxysilylpropyl) Ammonium Chloride, Silyl Ammonium Halides, silyl amine salt compounds, non-reactive ammonium salts, Tetramethylammonium Hydroxide, Methyltributylammonium hydroxide, Lautrimonium Chloride, Behentrimonium Chloride, Methyltriectylammonium Chloride, Quarternary Ammonium Halides or combined mixtures of the above.

The inventors have discovered that by mixing of negatively charged granulated aerogels with positively charged granulated aerogels, the resulting mixture generally creates a substantially neutral charged improved granulated aerogel, e.g., a generally "sticky" or "tacky" mixture. That is, the individual negatively charged particles and the positively charged particles tend to attract to one another and "stick together" to form larger particles, agglomerates, masses or clumps of granulated aerogel. It is to be appreciated that the resulting larger particles, agglomerates, masses or clumps of granulated aerogel generally have a neutral or relatively low static charge, e.g., the aerogel generally has a positive charge of, for example, between 0.01 KV per inch and 1.0 KV per inch or above.

The inventors have discovered that it also is possible to add a suitable concentration of the CMA to the entire quantity of the aerogel granules, to non-uniformly modify the surfaces of the granules and create the same localized attractions and eliminate the need to make and mix two separate aerogel compositions with one another. This improved aerogel also can be used in applications where there is concern that an aerogel filled panel, container or structure may be subjected to a breach. For example, after installation of a fenestration panel, a hole is drilled through the panel, container or structure for the purpose of permitting associated piping or electrical wiring, for example, to pass or extend there through. Once the hole is drilled into the panel, container or structure, the aerogel granules, without the modified aspect of the present invention, typically readily flow or pour out through the hole formed in the panel, container or structure thereby causing a loss of some of aerogel material there from (possibly a significant loss) and/or creating a spill which generally entails utilization of a somewhat difficult recovery procedure. A similar loss can also be experienced when, during handling, the panel, container or structure is partially broken, cracked, breached or otherwise sufficiently damaged so as to create an opening or aperture in the panel, container or structure through which some of the aerogel granules can readily flow. The clumpy or agglomerates of the aerogel, due to the use of mixtures of oppositely charged aerogel granules according to the present invention, significantly reduces the tendency of the aerogel particles to flow out through any breach or other opening intentionally or inadvertently formed within the panel, container or structure.

Another application for the improved granulated silica or other aerogel of this invention is where the aerogels are combined with fiber mats, or mixed with fibers to form an insulated blanket(s) or composite(s) in order to minimize the dust and aerogel loss commonly observed during installation, handling and cutting of such products.

It is to be appreciated that aerogels are highly porous ceramic materials. Generally, these materials are produced by forming a gel which contains a solvent. Once the solvent is removed, a porous solid component is formed. It is to be appreciated that removal of the solvent, while still preserving the porous solid structure, can be a difficult process because the gel often shrinks upon removal of the solvent and this causes the porous solid structure to collapse, thereby leaving an optically transparent material with a relatively small surface area and a low pore volume, referred to as "Zeolite."

The Keller Companies, Incorporated, of Manchester, N.H. (the Assignee of this invention), developed a sol-gel modification technique which is used for the preparation of metal alkoxide sol-gels in a solvent that, when dried, produce positively charged aerogels. When such positively charged aerogels are suitably combined with conventional and typical negatively charged aerogels, the positively and negatively charged aerogels attract to one another and resulting mixture has a relatively neutral or low static charge, also minimizes the creation of dust, and generally has an agglomerated, clumpy, sticky or tacky nature which minimizes the flowability of the resulting aerogel mixture.

More specifically, aerogels that are modified with a CMA, such as N-Trimethoxisilylpropyl-N,N,N-Trimethyl Ammonium Chloride, Octadecyldimethyl (3-Trimethoxysilylpropyl) Ammonium Chloride, Silyl Ammonium Halides, silyl amine salt compounds, non-reactive ammonium salts, Tetramethylammonium Hydroxide, Methyltributylammonium 4-hydroxide, Lautrimonium Chloride, Behentrimonium Chloride, Methyltriectylammonium Chloride, Quarternary Ammonium-Halides or combined mixtures of the above, to create positively charged granules, are mixed with the conventional unmodified negatively charged aerogel granules, such as those available from the Cabot Corporation, of Billerica, Mass. 01821, and designated as "Lumira"™ or other hydrophobic and hydrophilic aerogels, commonly prepared from Hydrolyzed Tetramethoxysilane, Tretraethoxysilane, polydisiloxanes, polytrisiloxanes, or aerogels derived from waterglass silicates, following well known and conventional formulations and procedures, thereby to produce a generally static free, e.g., a clumpy, sticky or tacky aerogel product of both positively and negatively charged particles.

Further, conventionally formed aerogels (e.g., which typically have negative charges) can be re-soaked in an appropriate solvent(s) and a CMA(s), and then re-dried to produce positively charged aerogels that can then be combined with the conventional aerogel or other negatively charged aerogels, to create a mixture having a lower static charge with reduced dustiness, and reduced fluidity, flow or flowability characteristics. In order to achieve the beneficial effects of the present invention, the ratio of the volume of the positively charged aerogel particles to the volume of negatively charged aerogel particles can vary but preferably ranges from about 20:80 to about 80:20, more preferably the ratio of the volume of the positively charged aerogel particles to the volume of negatively charged aerogel particles preferably ranges from about 40:60 to about 60:40, and ideally the volume or amount of the positively charged aerogel particles is approximately equal to the volume or amount of negatively charged aerogel particles, e.g., approximately a 50:50 ratio.

The CMA can be added to the liquid formulation components, either prior to mixing and subsequent gelation, during the preparation of the sol-gel, or added to a soaking solution of ethanol, or a similar solvent, following the formation of the sol-gel granules and allowed to react with the gel internal and external surfaces over time and/or at an elevated temperature. Only a moderate temperature of about 20° C. to about 60° C. and a relatively short duration of time of between about 1 to 24 hours are typically required to react or coat a majority of the gel with the CMA. It is to be appreciated that other hydrophobing agents can be incorporated in the formulation and soaking solution, as would be typical of processes to form hydrophobic aerogels and are disclosed in several patents, such as U.S. Pat. Nos. 5,830,387 and 5,496,527. Alternatively, previously formed hydrophobic and hydrophilic aerogel granules can also be soaked in a CMA-solvent solution for similar time durations and temperatures, re-dried following typical drying procedures using liquid $CO_2$, supercritical $CO_2$, ambient pressure oven drying at elevated temperatures, or other liquid and supercritical organic gases. The resulting aerogels and xerogels (when dried using ambient pressure) when mixed with the non-modified conventional aerogels will form clumpy, agglomerated aerogels that have reduced neutral static charge and/or dustiness.

It is to be appreciated that the lengths of the reaction time and drying times of the aerogel are dependent upon the pore size, the particle size distribution, the tortuosity of the pores and the thickness of the aerogel samples being prepared, since it is the thickness, i.e., the largest dimension of the aerogel sample being prepared, that determines the required distance for heat and mass diffusion to occur during the reaction and the drying processes. The time-required for solvent exchange varies approximately proportionally to the square of the sample thickness. Production of smaller granules of gel, and subsequently aerogel, facilitates mixing of the positively and the negatively charged aerogels to form a mixture having a low or substantially neutral static charge, low or substantially no dust, and a product which clumps together and thus has a "sticky" or "tacky" nature. Ideally, the granules will have particle sizes of between 0.2 and 20 millimeters, and more ideally the particle size will be between 1 and 5 millimeters.

The present invention also relates to a method of manufacturing an aerogel having reduced dustiness and a relatively low or substantial neutral static charge by using the method comprising the steps of:

a) (1) Preparing a precursor solution from TEOS, TMOS, or other metal alkoxide, water, ethanol or methanol or other compatible solvent, and a small amount of concentrated strong acid, such as oxalic, hydrochloric acid (HCL) or sulfuric acid ($H_2SO_4$), (2) Warming the solution and allowing the solution to react slowly for about 1 to about 24 hours. Alternatively, hydrolyzed precursors such as silicon based hydrolyzed TEOS can be purchased commercially having essentially the same preparation process and end properties as those produced by following the process in step (a-1). A commercial product that can be used in step (a-1) is sold under the trade name "H-5" by the Silbond Corporation, of Weston, Mich. 49289; alternatively, conventional waterglass solutions can be prepared or obtained.

b) Preparing a "base" catalyst solution with a pH between 7.5 and 13 using mixtures of water, ethanol or methanol or other compatible solvent, and a strong base such as Ammonium Hydroxide, Hydrazine, Guanidine, Tetramethylguanidine, Potassium Hydroxide, Sodium Hydroxide, Tetramethyl ammonium salts, or other strong bases.

c) If desired, preparing a hydrophobing agent solution of ethanol or methanol or some other compatible solvent, and a hydrophobing agent such as Hexamethyldisilazane (HMDZ), Hexamethyldisiliconoxide (HMDSO), Trimethylethoxysilane (TMES), Trimethylchlorosilane (TMCS) or a similar compound.

d) Preparing a CMA solution by mixing, for example, salts such as reactive N-Trimethoxisilylpropyl-N,N,N-Trimethyl Ammonium Chloride, Octadecyldimethyl (3-Trimethoxysilylpropyl) Ammonium Chloride, Silyl Ammonium Halides, silyl amine salt compounds, non-reactive ammonium salts, Tetramethylammonium Hydroxide, Methyltributylammonium hydroxide, Lautrimonium Chloride, Behentrimonium Chloride, Methyltriectylammonium Chloride, Quarternary Ammonium Halides or combined mixtures of the above with ethanol, methanol or another suitable solvent that is compatible with the precursor solution. Optionally, if using a hydrophobing solution, the CMA can be added to the hydrophobing solution, of step (c), if it is to be added to the formulation prior to combining the solutions and subsequent gelation. The CMAs described above can also add some hydrophobic characteristics to the dried product, reducing the amount of alternative hydrophobing agents necessary to form a water resistant aerogel.

e) Solutions from steps (a), (b) and (c), and optionally step (d), are then combined quickly, either in series or simultaneously, while mixing to form a mixture having a pH between 7.2 and 12.

f) Depending on the concentrations of the components, the amount of solvent, and the temperature, the mixed solution will typically gel within a time period of between 0.3 to 240 minutes to form a sol-gel.

g) Following gelation, the gel can be cut into small pieces or granules, if desired, to improve drying and mixing uniformity.

h) Following gelation, the gel is covered with a compatible soaking solvent solution of, for example, ethanol, methanol or another suitable solution and is aged at temperatures between about 20° C. and 70° C. for about 1 to about 24 hours to complete the reaction process.

l) If the CMA solution of step (d) was not added to the gel formulation, it is then added to the soaking solution described above in step (h) and the mixture of gel, the covering solvent, and antistatic solution is allowed to age during this step. If desired, solutions from steps (b)

and (c), and optionally step (d) above, can be combined prior to mixing with the precursor solution of step (a).

j) Either drying the gel (1.1.1) at a temperature of at least 97° F. (36° C.) at ambient pressure, or (1.1.2) in a high pressure vessel heated under pressure at a temperature above the supercritical temperature of the organic solvent and then (1.2) allowing the gas to vent while maintaining the supercritical temperature to form the aerogel; or (2) removing the solvents using liquid or supercritical $CO_2$ extraction techniques will yield a low density aerogel with a "positive" charge. This positively charged aerogel can then be mixed with typical or conventional negatively charged aerogel—produced without the addition of the CMA—to form the desired relatively low static, low dust, low flow aerogel embodied by the present invention, as shown in FIG. 1.

The present invention is directed to an improved process and novel chemistry for the manufacture of a variety of types of aerogel products, including granules, films, monoliths and hybrid composites.

The term "aerogel", as used within this patent application and the appended claims, generally includes structures that are microporous or have a nanoporous lattice from which a solvent has been removed, such as a xerogel, silica gel and water glass.

The term "granules", as used within this patent application and the appended claims, generally refers to aerogel bodies of a generally organized dimensional geometry for specific applications that were optimized for an efficient end use. Typically granules are less than 300 cc in volume.

The term "monolith", as used within this patent application and the appended claims, generally refers to a single aerogel body having a minimum dimension, i.e., a thickness, with the other two dimensions being larger than the thickness or to a cylindrical object having a diameter. The thickness or diameter is typically in the range of millimeters to tens of centimeters.

The term "hybrid", as used within this patent application and the appended claims, generally refers to an aerogel that has been formed with another substance, e.g., glass fibers dispersed in the gels or glass fibers doped with the aerogel raw materials (precursor-solvent-catalyst), or a new chemistry which involves a modified silica backbone.

The term "solvent", as used within this patent application and the appended claims, generally refers to the liquid dispersion medium used to form the gels which is later removed to form the aerogel in accordance with the invention the stage at which the solution begins to exhibit pseudoelastic properties and the viscosity of the solution has increased and is generally in the range of between about 5500-10000 cps (centipoise) or more preferably in the range of between at about 7500-8000 cps which thereby indicates gelling of the solution.

The terms "standard aerogel" or "conventional aerogel", as used within this patent application and the appended claims, both generally refer to an aerogel which is manufactured according to one of the known prior art techniques and generally has a negative charge.

The term "modified aerogel", as used within this patent application and the appended claims, generally refers to an aerogel which is manufactured in accordance with the teachings and disclosures of this application so that the resulting aerogel generally has a positive charge.

The term "charge modifying additive" (CMA), as used within this patent application and the appended claims, generally means a compound which, when added to the sol-gel formulation or to a soaking solution, either prior to drying or during the drying process, alters the charge of the aerogel to be electrically.

The term "aerogel composition", as used within this patent application and the appended claims, generally refers to a composition of aerogel which comprises both positively charged aerogel particles and negatively charged aerogel particles and possibly some aerogel fines and/or dust.

The term "neutral charge", as used within this patent application and the appended claims, generally refers to a composition of aerogel in which the resulting charge, from both the positively and the negatively charged aerogel particles, is substantially zero, although the aerogel composition may be slightly positively or negatively charged.

BRIEF DESCRIPTION OF DRAWINGS

The invention will now be described, by way of example, with reference to the accompanying drawings in which:

FIG. 1 is a diagrammatic representation of (1) negatively charged aerogel granules (−), (2) both positively and negatively charged aerogel granules intermixed with one another to form an agglomerated, substantially neutral charge aerogel composition according to the present invention (+−), and (3) positively charged aerogel granules (+)

DETAILED DESCRIPTION OF THE INVENTION

Figure 2:
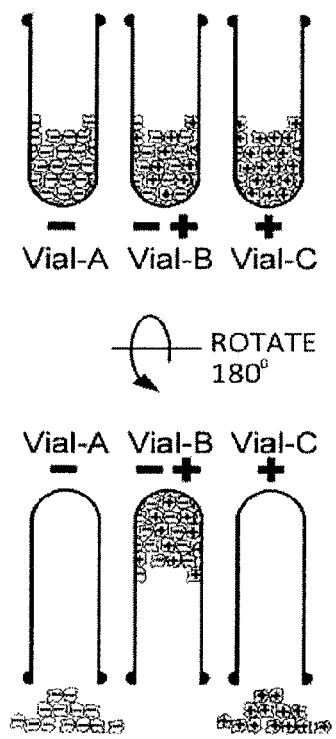
FIG. 2 is a diagrammatic representation of the observed results from Example 8 when vials filled with: un-modified negatively charged aerogel granules (designated as Vial A), a 50/50 mixture of negatively charged aerogel granules and positively charged aerogel granules (designated as Vial B), and positively charged granules (designated as Vial C), and, when each of Vials A, B and C are turned upside down, only the 50/50 mixture, in Vial B, forms an agglomeration that clings to the bottom of the vial.

Aerogels are open pore materials having a porosity, by volume, of about 80% or more and a pore size which ranges from about 1-50 nm, with preferably the pore size range from about 5-30 nm, and most preferably the pore size ranges from about 20-25 nm. Aerogels may be prepared from any gel-forming material(s) from which the solvent, used for gelation, can be removed by a drying process without destroying, significantly shrinking and/or collapsing the pore structure. Drying can be accomplished, for example, by supercritical extraction, atmospheric drying, freeze-drying, vacuum drying, or the like. In the relevant art, aerogels are typically produced by an ambient pressure drying/extraction, liquid $CO_2$, or supercritical $CO_2$ extraction of the solvent (or any liquid replacement for the solvent) that was used to prepare the starting gels.

According to the method of the present invention, the aerogels of the inventive aerogel compound are ideally dried using either liquid or supercritical $CO_2$ extraction. The desirable properties of the inventive aerogel compound, however, can be obtained using the other methods of drying which are conventional or common to the formation of aerogel.

The precursors for synthesizing these colloids can comprise metal alkoxides, for example. The most widely used alkoxides are the alkoxysilanes, such as tetramethoxysilane (TMOS) and tetraethoxysilane (TEOS). Sodium silicate can also be used as a starting material but will require removal of the formed sodium salts prior to modification and drying.

The silation process and OH capping is the method used to cap free hydroxyl groups at which point the gel is rendered hydrophobic. The preferred silating agents are hexamethyl disilazane (HMDZ) and/or trimethylethoxysilane (TMES), but other agents such, as trimethylchlorosiloxane (TMCS), can be used. The primary hydrophobing agent(s) can also be combined with the silyl amine salts (antistatic agents) to provide both the antistatic positively charged aerogel and provide additional hydrophobic characteristics for the aerogel. Use of a hydrophobing agent is known in the art and the hydrophobing agent is incorporated into the gel in a conventional process. The primary hydrophobing agents can be added by any of the following techniques.

Typically, the hydrophobing agent is added to a "soaking solution" after the gel is formed and for a suitable time and at a suitable temperature so that the hydrophobing agent reacts with the sol-gel surface structure to attach the hydrophobing agent to the gel. Because the hydrophobing agent is dispersed or dissolved into the soaking solution, higher concentrations of the hydrophobing agent(s) are generally required than if the hydrophobing agent can be directly attached to the gel.

It is to be appreciated that pre-reacting the hydrophobing agent into the gel structure—by adding the hydrophobing agent to the formulation solutions, prior to gelation, and not into a soaking solution—eliminates the need to use a second soaking process or step for reacting the CMA with the sol-gel. Accordingly, the hydrophobing agent is preferably added by this second method or technique.

Once the gel is formed, it can be directly added to a soaking solution containing the CMA and allowed to age at a temperature of between about 20° C. and about 70° C. in order to complete the reaction(s). It is also possible to add the CMA to the formulation prior to gelation, but the positive electrical charge is then distributed on the surface and within the gel particle. Preferably, the positive charge would be only on the surface of the gel and, once dried, on the surface of the aerogel technique.

To form the inventive aerogel compound according to the present invention, the positively charged CMA modified aerogel, as described within this specification, is mixed with a negatively charged aerogel, prepared as described within this specification, but without the addition of the CMA prior to the drying process or with another negatively charged aerogel prepared by alternative process(es).

Below are examples of methods of creating the improved aerogel according to the present invention. It is to be appreciated that these examples are not exhaustive and are certainly not intended to be, in any manner, exclusive or in any way limiting the present invention. Many other related processes and procedures are contemplated for and considered to be within the spirit and scope of this disclosure for achieving the benefits of this invention.

Example 1

A. Preparation of Precursor Solution

Mass of alkoxide solution (Silbond H-5)=100 grams in which the alkoxide solution is composed of:
  Mass of hydrated silicate=27 grams
  Mass of ethanol=73 grams B. Preparation of Catalyst Solution Mass of absolute EtOH=100 grams
Mass of chilled de-ionized water=65 grams
Mass of ammonium hydroxide=1.75 grams
Mass of HMDZ hydrophobing agent=10 grams C. Creation of the Sol-Gel Mixing solutions A and B together until a gel is formed (in about 30 to 150 seconds), the gel was then allowed to continue reacting for about an additional 5 to 30 minutes until a firm "crumbly" gel is formed. The gel was then cut into small pieces of about 5 to 20 mm in size. A sufficient amount of additional absolute ethanol was added to cover the gel particles (about 50 ml). The solution and gel were allowed to age at 50° C. for about 1 hour.

D. Creation of the Positively Charged Sol-Gel

After aging, the solvent was drained away from the gel and 10 grams of Octadecyldimethyl (3-Trimethyoxysilylpropyl)-Ammonium Chloride was added to the drained and collected aging solution and this solution was then again used to cover the sol-gel. This mixture was allowed to age for about 12 hours at 50° C.

E. Drying of the Sol-Gel to Form an Aerogel

After aging, the solution from step D was drained and the gel particles were placed in a high pressure $CO_2$ drying vessel, such as a vessel which is typically used to prepare aerogels by extracting the liquids from the silica structure. The vessel was filled with 200 proof ethanol and sealed. Liquid $CO_2$, from a sparged tank, was allowed to flow through the vessel at room temperature and at a supplied pressure of between about 600 to about 900 psi for about 2 hours. The flow of $CO_2$ was then stopped and the vessel isolated. Once isolated, the vessel was slowly heated until the inside pressure and temperature were greater than necessary to achieve supercritical $CO_2$ within the vessel and the gel pieces. Heating continued while the vessel was slowly vented in order to maintain the supercritical conditions while reducing the amount of $CO_2$ present. Once the internal temperature of the vessel reached about 60° C., heating was discontinued and the remaining $CO_2$ was slowly vented until an ambient pressure was reached inside the vessel. The (CMA modified) aerogel had a density of 0.06 grams per cubic centimeter, 25% visible light transmission, and a very transparent appearance. The obtained granular aerogel was also measured, using a static charge meter, and the measured charge was 0.4 KV per inch.

This aerogel was then combined with an equal amount of an (standard) aerogel prepared following the same procedure above, but with the elimination of step D (addition of the silyl ammonium salt compound). The measured charge on the prepared (non silyl ammonium salt modified) standard aerogel was −0.5 KV per inch.

The positively charged (modified) areogel and the negatively charged (standard) aerogel particles were combined with one another and the resulting mixture formed a substantially neutral charge aerogel composition which had the same light transmission and density properties and, while free of any residual moisture or solvent, the resulting mixture had a consistency of a clumpy, "slushy", "sticky" or "tacky" agglomerated material, e.g., the positively and the negatively charged particles attracted one another and formed clumps and/or agglomerations of particles. The static charge measured on the resulting mixture was slightly positive, e.g., 0.05 KV per inch.

Example 2

A. Preparation of Precursor Solution

Mass of alkoxide solution (Silbond H-5)=100 grams
Mass of hydrated silicate=27 grams
Mass ethanol=73 grams B. Preparation of Catalyst Solution Mix together:
Mass of absolute EtOH=100 grams
Mass of chilled de-ionized water=65 grams
Mass of ethanol amine=6 grams
Mass of HMDZ hydrophobing agent=15 grams C. Creation of the Sol-Gel Mixing solutions A and B together until a gel was formed (in about 60 to 120 seconds) and the gel was allowed to continue reacting for an additional 5 to 30 minutes until a firm "crumbly" gel was eventually formed. The gel was then cut into small pieces of about 5 to 20 mm in size. A sufficient amount of additional absolute ethanol (about 50 ml) was added to cover the gel particles. The solution and gel were then allowed to age at 50° C. for about 1 hour.

D. Creation of the Positively Charged Sol-Gel

After aging, the solvent was drained away from the gel and 10 grams of antistatic agent Octadecyldimethyl (3-Trimethyoxysilylpropyl)-Ammonium Chloride was added to the drained and collected aging solution and this solution was again used to cover the sol-gel. This mixture was allowed to age for about 12 hours at 50° C.

E. Drying of the Sol-Gel to Form an Aerogel

After aging, the solution was again drained and the gel particles placed in a high pressure $CO_2$ drying vessel typical of those used to dry aerogels by extracting the liquids from the silica structure. The vessel was then filled with 200 proof ethanol and sealed. Liquid $CO_2$, from a sparged tank, at room temperature and at a pressure of between about 600 to about 900 psi was allowed to flow through the vessel for about 2 hours. The flow of $CO_2$ was discontinued and the vessel isolated. Once Isolated, the vessel was slowly heated until the inside pressure and temperature were greater than necessary to achieve supercritical $CO_2$ in the vessel with the gel pieces. The vessel was vented but heating continued so as to maintain the supercritical conditions while reducing the amount of $CO_2$ present within the vessel. Once the internal temperature of the vessel reached about 80° C., the heating was terminated and the remaining $CO_2$ was slowly vented. The resulting aerogel had a density of 0.07 grams per cc.

This (modified) aerogel was then combined with an equal amount of second (standard) aerogel prepared by also following the above procedure except that step D, the addition of the CMA, was eliminated during preparation of the second (standard) aerogel. Once combined with one another, the resulting mixture had the same light transmission and density properties and exhibited the same clumpy, sticky or tacky characteristics as observed in Example 1.

Example 3

CMA modified aerogel prepared following the procedures described in Example 1 is mixed, at various ratios, with commercially available Cabot Nanogel granules. The results of those various mixtures are described in the table below:

| Ratio of CMA Modified to Cabot Naogel by Volume | Appearance | Stickiness | Antistatic characteristics | Dustiness after shaking |
|---|---|---|---|---|
| 0:100 | Very translucent | No | No | Yes |
| 20:80 | Very translucent | Yes with slight amount of settling to bottom of vial | Yes | No |
| 40:60 | Very translucent | Yes with no settling to bottom of vial | Yes | No |
| 50:50 | Very translucent | Yes with no settling to bottom of vial | Yes | No |
| 60:40 | Very translucent | Yes with no settling to bottom of vial | Yes | No |
| 80:20 | Very translucent | Yes with slight settling of granules to the bottom of vial | Yes | Slight amount of dust on bottom of vial |
| 100:0 | Very translucent | No with all granules falling to the bottom of the vial | No | Yes |

Example 4

A. Preparation of Precursor Solution

Mass of Tetraethoxysilane=20 grams
Mass of methanol=60 grams
Mass of 0.0001 M of oxalic acid solution in $H_2O$=8 grams
The above components were mixed together and then allowed to age for about 24 hours at 25° C.

B. Preparation of Catalyst Solution

Mass of 3M Ammonium Hydroxide=1.06 grams
Mass of $H_2O$=2 grams
Mass of 0.1M Ammonium Fluoride solution=2 grams
The above components were mixed together.

C. Creation of the Aerogel

Mixing solutions A and B together until gel is formed (typically within about 15 to 20 minutes) and the gel then allowed to continue reacting for an additional 4 hours until a firm "crumbly" gel is formed. The gel was then cut into small pieces of about 5 to 20 mm in size. A sufficient amount of methanol (about 50 ml) is added to cover the gel particles. The solution and gel were allowed to age at 50° C. for about 4 hours. The solvent is drained from the gel and the gel is re-covered with a new fresh coating of methanol (e.g., about 50 ml). This draining and recovering process was repeated 2 more times.

The gel is then drained and hexane is added to the gel along with 15 grams of the HMDZ hydrophobing agent. The gel is aged over night (approximately 8 hours) at 50° C. The solvent is drained from the gel and the gel placed in an oven at 300°

F. for about 12 hours. The final product is an aerogel having a slightly "cloudy" appearance and a density of 0.09 g/cc.

D. Creation of the Positively Charged Aerogel

Mixing solutions A and B together until a gel is formed (typically within about 15 to 20 minutes) and the gel allowed to continue reacting for an additional 4 hours until a firm "crumbly" gel is formed. The gel was then cut into small pieces of about 5 to 20 mm in size. A sufficient amount of methanol (about 50 ml) was added to cover the gel particles. The solution and gel were allowed to age at 50° C. for about 4 hours. The solvent was drained from the gel and then the gel was then recovered with a new fresh coating of methanol (e.g., about 50 ml). This draining and recovering process was repeated 2 more times.

The gel was then drained and hexane was added to the gel along with 15 grams of the HMDZ hydrophobing agent. The gel was aged over night (approximately 8 hours) at 50° C. The solvent was drained from the gel and 3 grams of Octadecyldimethyl (3-Trimethyoxysilylpropyl)-Ammonium Chloride in 50 ml of hexane was added to cover the gel. This mixture was allowed to age for about 24 hours at 50° C. The resulting gel was then dried at 350° F. for about 8 hours to form a low density aerogel similar in appearance to the aerogel prepared by using steps A to C, described above.

This (modified) aerogel was then mixed with an equal amount of (standard) aerogel which was prepared using step C discussed above. The resulting mixture maintained the same cloudy appearance and density properties while being substantially free of any residual moisture or solvent, and also exhibited the clumpy or sticky characteristic. No statically charged characteristics were observed in this aerogel product.

Example 5

A. Preparation of Precursor Solution

Mass of alkoxide solution (Silbond H-5)=100 grams

B. Preparation of Catalyst Solution

Mass of absolute EtOH=100 grams
Mass of chilled de-ionized water=65 grams
Mass of Tetramethylguanidine=3 grams
Mass of Trimethylethoxy silane=12 grams

C. Creation of the Sol-Gel

Mixing solutions A and B together until a gel was formed (typically within about 3 to 6 minutes) and the gel was covered with ethanol and allowed to continue reacting for an additional 15 minutes at room temperature. The gel was then cut into small pieces of about 5 to 20 mm in size. A sufficient amount of additional absolute ethanol (about 50 ml) was added to cover the gel particles. The solution and gel were then allowed to age at a temperature of about 50° C. for about 18 hours.

D. Creation of the Positively Charged Sol-Gel

After aging, the solvent was drained away from the gel and 3 grams of antistatic agent Octadecyldimethyl (3-Trimethyoxysilylpropyl)-Ammonium Chloride mixed with 50 ml of ethanol was used to cover the sol-gel. This mixture was allowed to age with the gel for about 12 hours at 50° C. The gel was rinsed with a new fresh quantity of ethanol (e.g., 50 ml of ethanol) 2 more times.

E. Drying of the Sol-Gel to Form an Aerogel

The solution was drained and the gel particles placed in a high pressure $CO_2$ drying vessel, typical of those used to dry aerogels by extracting the liquids from the silica structure. Supercritical $CO_2$ then flowed through the pressure vessel for about 4 hours. The flow of $CO_2$ was discontinued and the $CO_2$ was slowly vented. The resulting aerogel had a density of 0.05 grams per cc. When this aerogel was poured into the collection container, no static charge was observed.

This aerogel was then combined with an equal amount of an (standard) aerogel prepared by using the same above described procedure but with the elimination of step D—the addition of the antistatic compound—to the second (standard) aerogel. The resulting mixture of the first (modified) aerogel and the second (standard) aerogel exhibited the same light transmission and density properties and exhibited the same clumpy, sticky or tacky characteristics observed in Example 1.

Example 6

A. Preparation of Precursor Solution

Mass of alkoxide solution (Silbond H-5)=100 grams

B. Preparation of Catalyst Solution

Mass of absolute EtOH=100 grams
Mass of chilled de-ionized water=65 grams
Mass of ammonium hydroxide=1.75 grams
Mass of HMDZ hydrophobing agent=10 grams

C. Creation of the Sol-Gel

Mixing solutions A and B together until a gel was formed (typically within about 60 to 120 seconds) and the gel allowed to continue reacting for an additional 5 to 30 minutes until a firm "crumbly" gel developed. The gel was then cut into small pieces of about 5 to 20 mm in size. A sufficient amount of additional absolute ethanol (e.g., about 50 ml) was added to cover the gel particles. The solution and gel were allowed to age at 50° C. for 1 about hour.

D. Creation of the Positively Charged Sol-Gel

After aging, the solvent was drained away from the gel and 10 grams of antistatic agent Octadecylbis (triethoxysilylpropyl)-Ammonium Chloride was added to the drained and collected aging solution and this solution, with the antistatic agent, was again used to cover the sol-gel. This mixture was allowed to age for about 12 hours at 50° C.

E. Drying of the Sol-Gel to Form an Aerogel

After aging, the aging solution, with the antistatic agent, was drained and the gel particles were placed in a high pressure $CO_2$ drying vessel typical of those used to dry aerogels by extracting the liquids from the silica structure. The vessel was then filled with 200 proof pure ethanol and sealed. Liquid $CO_2$, from a sparged tank, at room temperature and at a pressure of between about 600 to 900 psi was allowed to flow through the vessel for about 2 hours. The flow of $CO_2$ was then terminated and the vessel isolated. Once isolated, the vessel was slowly heated until the pressure and temperature, inside the vessel, were greater than necessary to achieve supercritical $CO_2$ within the vessel with the gel pieces. While the heating continued, the vessel was vented so as to maintain the supercritical conditions while reducing the amount of $CO_2$ present. When the internal temperature of the vessel reached 75° C., the heating was discontinued and the remaining $CO_2$ was slowly vented.

The resulting (modified) aerogel had a density of 0.06 grams per cc, but had a very cloudy appearance with low light transmission. This modified aerogel was then combined with an equal amount of a second (standard) aerogel prepared by following the same procedure, described above in Example 6, but with the elimination of step D, the addition of the antistatic compound. The resulting mixture of the first (modified) aerogel and the second (standard) aerogel had the same density as the individual batches prior to combining with one another, and, while free of any residual moisture or solvent, had the consistency of a clumpy, sticky or tacky material with no apparent, or a relatively low, static charge.

Example 7

A. Preparation of Precursor Solution

Mass of alkoxide solution (Silbond H-5)=100 grams

B. Preparation of Catalyst Solution

Mass of absolute EtOH=100 grams
Mass of chilled de-ionized water=65 grams
Mass of Tetramethylguanidine=3 grams
Mass of Trimethylethoxy silane=12 grams
Mass of CMA Octadecyldimethyl(3-Trimethyoxysilylpropyl)-Ammonium Chloride=3 grams C. Creation of the Sol-Gel Mixing solutions A and B together until a gel was formed (typically within about 3 to 6 minutes) and the gel was then covered with ethanol and allowed to continue reacting for about an additional 15 minutes at room temperature. The gel was then cut into small pieces of about 5 to 20 mm in size. A sufficient amount of additional absolute ethanol (e.g., about 50 ml) was added to cover the gel particles. The solution and gel were allowed to age at a temperature of about 50° C. for about 18 hours and then rinsed with a new fresh quantity of ethanol (e.g., about 50 ml).

D. Drying of the Sol-Gel to Form an Aerogel

The solution was drained and the gel particles were then placed in a high pressure $CO_2$ drying vessel typical of those used to dry aerogels by extracting the liquids from the silica structure. Supercritical $CO_2$ was permitted to flow through the pressure vessel for about 4 hours. The flow of the supercritical $CO_2$ was then discontinued and the $CO_2$ was slowly vented from the drying vessel. The resulting (modified) aerogel had a density of 0.07 grams per cc. The appearance of the aerogel was cloudy with a light blue color.

This aerogel was then combined with an equal amount of an (standard) aerogel prepared following the same procedure, described above in Example 6, but with Cabot Nanogel granules. The resulting mixture had a clumpy, sticky or tacky antistatic characteristics similar to the characteristics observed in Example 1.

Example 8

Charged Modification of Dried Aerogel

A. Preparation of the Positively Charged Aerogel Granules 20 grams of hydrophobic "Cabot Nanogel" aerogel granules were solvated in a solution of 50 grams of 200 proof ethanol and 1 gram of a charge modifying additive Octadecyldimethyl (3-Trimethoxsilylpropyl)-Ammonium Chloride. The solvated Cabot Nanogel-CMA mixture was aged at a temperature of 50° C. for 26 hours.

Excess liquid (solvent plus unreacted CMA) was drained from the above mixture to yield a CMA modified Cabot Nanogel sol-gel. The CMA modified sol-gel was then dried in an oven at a temperature of about 150° C. for 24 hours. After drying a low density, positively charged aerogel was obtained.

B. Preparation of the Low Static, Low Dust Agglomerated Aerogel Mixture 5 grams of hydrophobic "Cabot Nanogel" granules were mixed in a vial with 5 grams of the Cabot Nanogel-CMA (modified) aerogel from above and placed in a vial (e.g., Vial B). The vial containing the mixture was shaken and tapped on the bottom to consolidate the aerogel. For comparison, 10 grams of "Cabot Nanogel" aerogel granules (negatively charged) were added to a similar vial (Vial A), and 10 grams of the CMA modified "Cabot Nanogel" aerogel (positively charged) were added to another vial (Vial C). These vials were also shaken and tapped.

C. Results.

The aerogel granules in Vials A and C remained loose and readily flowed out of the respective vials when the vials were turned upside down. The mixture of unmodified and CMA modified aerogel, in Vial B, formed an agglomerated structure that when the vial was turned upside down stayed suspended to the bottom of the vial. These results are depicted in FIG. 2. After 10 months elapsed time, the aerogel mixture in Vial B still remains suspended. Further, there were no loose aerogel fines observed in the mixture of the positively and the negatively charged aerogel granules in Vial B.

Example 9

A. Preparation of Precursor Solution

Mass of alkoxide solution (Silbond H-5)=100 grams
Mass of hydrated silicate=27 grams
Mass ethanol=73 grams B. Preparation of Catalyst Solution Mix together:
Mass of absolute EtOH=100 grams
Mass of chilled de-ionized water=65 grams
Mass of ethanol amine=6 grams
Mass of HMDZ hydrobing agent=15 grams C. Creation of the Sol-Gel Solutions A and B were mixed together until gel was formed (typically within about 60 to 120 seconds) and the gel was allowed to continue reacting for about 5 to 30 minutes until a firm "crumbly" gel was formed. The gel was then cut into small pieces 5 to 20 mm in size. Enough additional absolute ethanol was added to cover the gel particles (about 50 ml). The solution and gel were allowed to age at 50° C. for about 1 hour.

D. Creation of the Positively Charged Sol-Gel

After aging, the solvent was drained away from the gel and 10 grams of Mason Chemical LATAC-30, composed of Laurtrimonium Chloride, was added to the collected aging solution and this solution was again used to cover the sol-gel. This mixture was allowed to age for 12 hours at 50° C.

E. Drying of the Sol-Gel to Form an Aerogel

After aging, the solution was drained and the gel particles placed in a high pressure $CO_2$ drying vessel typical of those used to dry aerogels by extracting the liquids from the silica structure. The vessel was then filled with 200 proof ethanol and sealed. Liquid $CO_2$ from a sparged tank was allowed to flow through the vessel at room temperature and at a pressure of between 600 to 900 psi for about 2 hours. The flow of $CO_2$ was stopped and the vessel isolated. Once Isolated, the vessel was slowly heated until the inside pressure and temperature were greater than necessary to have supercritical $CO_2$ in the vessel with the gel pieces. The vessel was vented but heating was continued to maintain the supercritical conditions while reducing the amount of $CO_2$ present. When the internal temperature of the vessel reached about 80° C., the heating was discontinued and the remaining $CO_2$ is slowly vented. The resulting aerogel had a density of 0.07 grams per cc.

This aerogel was then combined with an equal amount of aerogel prepared by following the same procedure, described above in Example 9, but with the elimination of step D, the addition of the CMA. The resulting mixture formed an agglomerated mass, maintained the same light transmission and density properties as exhibited and observed in the aerogel product of Example 1.

Example 10

A. Preparation of Precursor Solution

Mass of alkoxide solution (Silbond H-5)=100 grams
Mass of hydrated silicate=27 grams
Mass ethanol=73 grams

B. Preparation of Catalyst Solution

Mix together:
Mass of absolute EtOH=100 grams
Mass of chilled de-ionized water=65 gram
Mass of ethanol amine=6 grams
Mass of HMDZ hydrophobing agent=15 grams

C. Creation of the Sol-Gel

Solutions A, and B were mixed together until gel was formed (typically within about 60 to 120 seconds) and the gel was allowed to continue reacting for about 5 to 30 minutes until a firm "crumbly" gel was formed. The gel was then cut into small pieces 5 to 20 mm in size. Enough additional absolute ethanol was added to cover the gel particles (about 50 ml). The solution and gel were allowed to age at 50° C. for about 1 hour.

D. Creation of the Positively Charged Sol-Gel

After aging, the solvent was drained away from the gel and 10 grams of 35% Tetraethylammonium hydroxide in ethanol was added to the collected aging solution and this solution was again used to cover the sol-gel. This mixture was allowed to age for about 12 hours at 50° C.

E. Drying of the Sol-Gel to Form an Aerogel

After aging, the solution was drained and the gel particles placed in a high pressure $CO_2$ drying vessel typical of those used to dry aerogels by extracting the liquids from the silica structure. The vessel was then filled with 200 proof ethanol and sealed. Liquid $CO_2$ from a sparged tank was allowed to flow through the vessel at room temperature and at a pressure of between 600 to 900 psi for about 2 hours. The flow of $CO_2$ was discontinued and the vessel isolated. Once isolated, the vessel was slowly heated until the inside pressure and temperature were greater than necessary to have supercritical $CO_2$ in the vessel with the gel pieces. The vessel was vented but heating was continued to maintain the supercritical conditions while reducing the amount of $CO_2$ present. When the internal temperature of the vessel reached 80° C., the heating was stopped and the remaining $CO_2$ was slowly vented. The resulting aerogel had a density of 0.07 grams per cc. This aerogel was then combined with an equal amount of aerogel prepared following the same procedure, described above in Example 10, but with the elimination of step D, the addition of the CMA. The resulting mixture formed an agglomerated mass, maintained the same light transmission and density properties as exhibited and observed by the aerogel product in Example 1.

Advantages of the Aerogel Composition According to the Present Invention.

The combined standard/modified aerogel products, according to the present invention, results in an aerogel composition which reduces the amount of associated dust, fines and particulate matter, results in an aerogel product which has a reduced static charge or a substantially neutral static charge (e.g., either a zero static charge or a slightly positive of negative static charge), and has a tendency to restrict, minimize or reduce the flow characteristics of the granulates of the aerogel so that the aerogel composition has less of a tendency to flow or pour out of a breached container compared with typical or standard granulated aerogel product.

Since certain changes may be made in the above described improved modified granulated aerogel and method of manufacturing the same, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Wherefore, we claim:

1. An aerogel composition having a substantially neutral charge, the aerogel composition comprising: a plurality of aerogel particles having positively charged portions being formed by addition of a charge modifying additive (CMA); and a plurality of aerogel particles having negatively charged portions; wherein the positively charged portions, of the plurality of aerogel particles having positively charged portions, are attracted to the negatively charged portions, of the plurality of aerogel particles having negatively charged portions, to form a plurality of clumps or agglomerates of the aerogel composition which at least one of minimizes static charge build-up, minimizes creation of loose dust and reduces flowability of the aerogel composition, wherein the charge modifying additive (CMA) is selected from the group consisting of N-Trimethoxysilylpropyl-N,N,N-Trimethyl Ammonium Chloride, Octadecyldimethyl (3-Trimethoxysilylpropyl) Ammonium Chloride, Silyl Ammonium Halides, silyl amine salt compounds, non-reactive ammonium salts, Tetramethylammonium Hydroxide, Methyltributylammonium hydroxide, Lautrimonium Chloride, Behentrimonium Chloride, Methyltriectylammonium Chloride, Quarternary Ammonium Halides and combined mixtures of the above.

2. The aerogel composition according to claim 1, wherein the aerogel composition comprises a ratio of the plurality of aerogel particles having positively charged portions to the plurality of aerogel particles having negatively charged portions is from about 20:80 to about 80:20.

3. The aerogel composition according to claim 1, wherein the aerogel composition comprises a quantity of the plurality of aerogel particles having positively charged portions which is substantially equal to a quantity of the plurality of aerogel particles having negatively charged portions.

4. A granular aerogel composition having a substantially neutral charge which minimizes creation of dust and reduces flowability of the granular aerogel composition, the granular aerogel composition comprising:
a plurality of aerogel particles being modified by interaction with a charge modifying additive in order to render a modified portion of the plurality of aerogel particles to have positively charged portions; and
a plurality of aerogel particles having negatively charged portions;
wherein in the positively charged portions, of the plurality of aerogel particles having positively charged portions, and the negatively charged portions, of the plurality of aerogel particles of having negatively charged portions, are electrically attracted to one t-another to form clumps or agglomerates of granular aerogel which have a substantially neutral charge and minimizes creation of dust and reduces flowability of the granular aerogel composition.

5. The aerogel composition according to claim 1, wherein the aerogel composition is produced by the method comprising the steps of:
a) mixing together a metal alkoxide, water, solvent, base catalyst and allowing the solution to form a sol-gel;
b) adding a charge modifying additive (CMA) to the sol-gel prior to drying;
c) drying the sol-gel to obtain the plurality of aerogel particles with the positively charged portions; and
d) combining the aerogel particles with the positively charged portions with the plurality of aerogel particles with the negatively charged portions to form the granular aerogel composition having the substantially neutral charge.

6. The aerogel composition according to claim 1, wherein the aerogel composition is produced by the method comprising the steps of:
a) preparing a precursor solution from water, a solvent, an acid and at least one of TEOS, TMOS or other metal alkoxide, and warming the precursor solution to allowing the precursor solution to react for a duration of time of between about 1 to about 24 hours, or using a sodium silicate solution or a de-ionized sodium silicate solution as the precursor solution;
b) preparing a base catalyst solution having a pH of between 7.5 and 13 and comprising a mixture of water, a solvent and a base;
c) mixing at least the precursor solution and the base catalyst solution with one another to form a mixture having a pH between 7.2 and 12;
d) allowing the mixture to gel, for a duration of time of between about 0.3 minutes to about 240 minutes, to form a sol-gel;
e) adding a charge modifying additive to the sol-gel prior to drying;
f) drying the sol-gel to obtain the aerogel particles with the positively charged portions; and
g) combining the aerogel particles with the positively charged portions with the aerogel particles with the negatively charged portions to form the granular aerogel composition having the substantially neutral charge.

7. The aerogel composition according to claim 1, wherein at least one of the plurality of aerogel particles having the positively charged portions and the plurality of aerogel particles having the negatively charged portions are hydrophobic.

8. The aerogel composition according to claim 6, wherein at least one of the aerogel particles with the positively charged portions and the aerogel particles with the negatively charged portions are rendered hydrophobic by adding a hydrophobing agent to one the precursor solution, the base catalyst solution or the mixture thereof, or
by adding the hydrophobing agent with the charge modifying additive, or
combining a solvent and a hydrophobing agent to form a hydrophobing agent solution, and adding the hydrophobing agent solution, prior to drying the sol-gel, to obtain the hydrophobic aerogel particles with the positively charged portions; and
combining the hydrophobic aerogel particles with the positively charged t-portions with the hydrophobic aerogel particles with the negatively charged portions to form the granular aerogel composition having the substantially neutral charge.

9. The aerogel composition according to claim 6, wherein further comprising the step of using one of ethanol and methanol as a solvent soaking solution for the sol-gel, after step (d), and soaking the sol-gel in the soaking solution for a period of about 0.25 to about 72 hours to facilitate completion of a sol-gel self-assembly process and improve properties of the aerogel particles with the positively charged portions.

10. The aerogel composition according to claim 6, wherein the charge modifying additive is added to the sol-gel, prior to drying, by either:
mixing the charge modifying additive with the mixture of at least the precursor solution and the base catalyst solution, or
adding the charge modifying additive to a soaking solution for the sol-gel following formation of the sol-gel.

11. The aerogel composition according to claim 9, wherein the charge modifying additive is added to the soaking solution by mixing the charge modifying additive with the solvent soaking solution and allowing the sol-gel to age in the solvent soaking solution.

12. The aerogel composition according to claim 6, wherein the charge modifying additive is added during the drying step (f) by injecting the charge modifying additive into a drying apparatus for drying the sol-gel to obtain the aerogel particles with the positively charged portions.

13. The aerogel composition according to claim 6, wherein the sol-gel is dried at a temperature of at least 97° F. (36° C.) and at ambient pressure in a drying apparatus comprising a pressure vessel heated under pressure to a temperature above a supercritical temperature of the solvent and then venting the gas while maintaining the supercritical temperature to form the aerogel particles with the positively charged portions.

14. The aerogel composition according to claim 6, wherein the sol-gel is dried by removing the solvents using one of a liquid $CO_2$ extraction technique and a supercritical $CO_2$ extraction technique to yield the aerogel particles with the positively charged portions.

15. The aerogel composition according to claim 6, wherein the sol-gel is dried by drying the sol-gel, in an oven at a temperature greater than 100° C. (37.7° C.), to remove the solvents.

16. The aerogel composition according to claim 6, wherein the sol-gel, following gelation, is cut into pieces to improve drying of the sol-gel.

17. The aerogel composition according to claim 6, wherein the mixture is cast into a thin film, prior to gelation, to facilitate subsequent interaction with the charge modifying solution.

18. The aerogel composition according to claim 6, wherein the acid from the group consisting of oxalic, hydrochloric acid (HCL), sulfuric acid ($H_2SO_4$) and strong acids.

19. The aerogel composition according to claim 6, wherein the base is selected from the group consisting of ammonium hydroxide, hydrazine, guanidine, tetramethylguanidine, potassium hydroxide, sodium hydroxide, tetramethyl ammonium salts and strong bases.

20. The aerogel composition according to claim 6, wherein the precursor solution comprises an available silicon based hydrolyzed precursor.

21. The aerogel composition according to claim 8, wherein the hydrophobing agent is selected from the group consisting of at least one of hexamethyldisilazane (HMDZ), hexamethyldisiliconoxide (HMDSO), trimethylethoxysilane (TMES), trimethylchlorosilane (TMCS) and combined mixtures thereof.

22. The aerogel composition according to claim 8, wherein the solvents are ethanol or methanol.

23. The aerogel composition according to claim 1, wherein the plurality aerogel particles having the positively charged portions are formed by combining the charge modifying agent with a solvents and a standard aerogel, and subsequently drying the modified aerogel.

* * * * *